United States Patent
Kobayashi et al.

(10) Patent No.: US 11,376,668 B2
(45) Date of Patent: Jul. 5, 2022

(54) CUTTING TOOL

(71) Applicant: Sumitomo Electric Hardmetal Corp., Itami (JP)

(72) Inventors: Yutaka Kobayashi, Itami (JP); Katsuo Kazahaya, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 124 days.

(21) Appl. No.: 16/335,550

(22) PCT Filed: Jul. 13, 2017

(86) PCT No.: PCT/JP2017/025550
§ 371 (c)(1),
(2) Date: Mar. 21, 2019

(87) PCT Pub. No.: WO2018/061408
PCT Pub. Date: Apr. 5, 2018

(65) Prior Publication Data
US 2019/0344355 A1   Nov. 14, 2019

(30) Foreign Application Priority Data
Sep. 29, 2016  (JP) .............................. JP2016-191640

(51) Int. Cl.
*B23B 27/14*  (2006.01)
*B23C 5/10*  (2006.01)

(52) U.S. Cl.
CPC ............... *B23B 27/14* (2013.01); *B23C 5/10* (2013.01); *B23B 2228/10* (2013.01); *B23C 2226/31* (2013.01)

(58) Field of Classification Search
CPC ....... B23B 27/14; B23B 27/148; B23B 27/20; B23B 2228/10; B23B 2226/31
See application file for complete search history.

(56) References Cited

U.S. PATENT DOCUMENTS

| 4,698,070 A | 10/1987 | Ohno |
| 5,486,137 A | 1/1996 | Flood et al. |

(Continued)

FOREIGN PATENT DOCUMENTS

| EP | 0540366 A1 | 5/1993 | |
| JP | 55125904 A | * 9/1980 | ............. B23B 27/20 |

(Continued)

OTHER PUBLICATIONS

English translation of JP 55-125904 A (Year: 1980).*

*Primary Examiner* — Alan Snyder
(74) *Attorney, Agent, or Firm* — Baker Botts L.L.P.; Michael A. Sartori

(57) ABSTRACT

A cutting tool includes: a rake face; a flank face continuous to the rake face; and a cutting edge formed by a ridgeline between the rake face and the flank face. The cutting tool includes: a base material having a first face on a side of the rake face and a second face on a side of the flank face; and a diamond layer covering the first face and the second face. The first face includes: a first top face continuous to the second face; and a second top face continuous to the first top face and disposed such that the first top face is sandwiched between the second top face and the second face. An angle formed between the first top face and the second top face is a negative angle in a cross section perpendicular to the cutting edge.

5 Claims, 6 Drawing Sheets

(56) References Cited

U.S. PATENT DOCUMENTS

2017/0072474 A1 3/2017 Minami et al.
2018/0161886 A1* 6/2018 Hasegawa ............. C23C 30/005

FOREIGN PATENT DOCUMENTS

| JP | 64-51202 A | 2/1989 |
| JP | 2005-103658 A | 4/2005 |
| JP | 2005-319529 A | 11/2005 |
| JP | 2011-005583 A | 1/2011 |
| JP | 2015-085462 A | 5/2015 |
| WO | 2015/146507 A1 | 10/2015 |

* cited by examiner

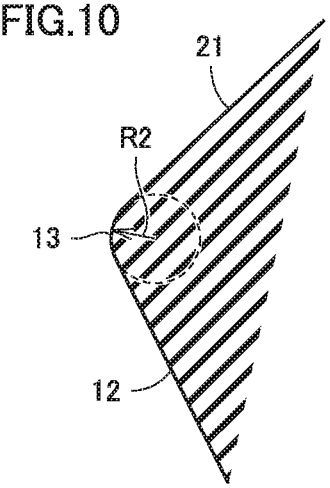

ions are incorporated herein by reference.

CUTTING TOOL

TECHNICAL FIELD

The present invention relates to a cutting tool. This application is a U.S. National Phase Application under 35 U.S.C. § 371 of International Application No. PCT/JP2017/025550 filed on Jul. 13, 2017, which claims the priority based on Japanese patent application No. 2016-191640 filed on Sep. 29, 2016. The International Application was published in Japanese on Apr. 5, 2018 as WO2018/061408 A1 under PCT Article 21(2). The entire contents of all of the above-noted applications are incorporated herein by reference.

BACKGROUND ART

Conventionally, a cutting tool disclosed in Japanese Patent Laying-Open No. 2015-85462 (PTL 1) is known as a cutting tool including a base material covered by a diamond layer. The main body of the cutting tool disclosed in PTL 1 includes a flank face, a rake face, and a cutting edge that is formed along the ridgeline along which the flank face and the rake face meet each other in a crosswise manner. The main body of the tool is covered by a hard coating.

In the cutting tool disclosed in PTL 1, a hard coating covering the rake face side of the main body of the tool is removed by a laser or the like in order to improve the cutting sharpness of the cutting tool.

CITATION LIST

Patient Literature

PTL 1: Japanese Patent Laying-Open No. 2015-85462

SUMMARY OF INVENTION

A cutting tool according to one embodiment of the present invention has: a rake face; a flank face continuous to the rake face; and a cutting edge formed by a ridgeline between the rake face and the flank face. The cutting tool includes: a base material having a first face on a side of the rake race and a second face on a side of the flank face; and a diamond layer covering the first face and the second face. The first face includes: a first top face continuous to the second face, and a second top face continuous to the first top face and disposed such that the first top face is sandwiched between the second top face and the second face. An angle formed between the first top face and the second top face is a negative angle in a cross section perpendicular to the cutting edge.

BRIEF DESCRIPTION OF DRAWINGS

FIG. 10 is an enlarged view of a region X in FIG. 9.

DETAILED DESCRIPTION

Figure 1:
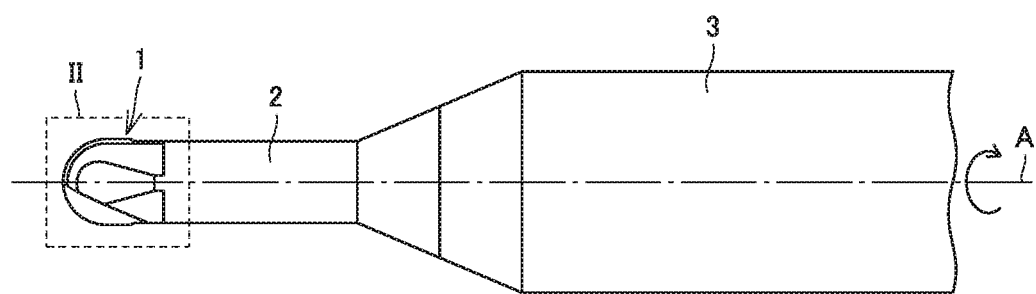
FIG. 1 is a top view of a cutting tool according to the first embodiment.

Problem to be Solved by the Present Disclosure

However, in the cutting tool disclosed in PTL 1, a hard coating is readily peeled off from the flank face side of the main body of the tool due to the principal cutting force received by the cutting tool from a workpiece during a cutting process. Accordingly, the durability of the cutting edge of the cutting tool disclosed in PTL 1 is insufficient.

One embodiment of the present invention has been made in consideration of the above-described problems. An object of the present invention is to provide a cutting tool for which the durability of the cutting edge can be improved.

Advantageous Effect of the Present Disclosure

According to one embodiment of the present invention, it becomes possible to provide a cutting tool for which the durability of the cutting edge can be improved.

DESCRIPTION OF EMBODIMENTS

First, the embodiments of the present invention will be described as listed below.

(1) A cutting tool according to one embodiment of the present invention includes: a rake face 11; a flank face 12 continuous to rake face 11; and a cutting edge 13 formed by a ridgeline between rake face 11 and flank face 12. The cutting tool includes: a first face 41 on the rake face side; a base material 4 having a second face 42 on the flank face side; and a diamond layer 5 covering first face 41 and second face 42. First face 41 includes: a first top face 41$a$ continuous to second face 42; and a second top face 41$b$ continuous to first top face 41$a$ and disposed such that first top face 41$a$ is sandwiched between second top face 41$b$ and second face 42. In the cross section perpendicular to the cutting edge, an angle $\theta 1$ formed between first top face 41$a$ and second top face 41$b$ is a negative angle.

According to the cutting tool described in the above (1), the principal cutting force exerted in the flank face direction during cutting can be supported from below by the first top face (a negative land face). Thus, peeling-off of the diamond layer from the flank face side can be suppressed. As a result, the durability of the cutting edge can be improved. Furthermore, the contact area between the base material and the diamond layer is increased when the first top face is included as compared with the case where the first top face is not included. Therefore, according to the cutting tool described in the above (1), the adhesiveness of the diamond layer to the base material can be improved.

(2) In the cutting tool according to the above (1), angle $\theta 1$ formed between first top face 41$a$ and second top face 41$b$ may be −20° or more and less than 0°. Thereby, the durability of the cutting edge can be further improved.

(3) In the cutting tool according to the above (1) or (2), a radius of curvature R1 in a tip portion of cutting edge 13 may be 0.01 μm or more and 10 μm or less. Thereby, the cutting sharpness of the cutting tool can be improved while maintaining the high durability of the cutting edge.

(4) In the cutting tool according to the above (1) or (2), rake face 11 may include a first rake face portion 21 continuous to flank face 12, and a second rake face portion 22 continuous to first rake face portion 21 and disposed such that first rake face portion 21 is sandwiched between second rake face portion 22 and flank face 12. An angle θ2 formed between first rake face portion 21 and second rake face portion 22 may be a negative angle in a cross section perpendicular to cutting edge 13. Thereby, minute chipping of the cutting edge occurring in the early stage of the process can be suppressed.

(5) In the cutting tool according to the above (4), angle θ2 formed between first rake face portion 21 and second rake face portion 22 may be −20° or more and less than 0°. Thereby, the cutting sharpness of the cutting tool can be improved while suppressing minute chipping of the cutting edge in the early stage of the process.

(6) In the cutting tool according to the above (4) or (6), a radius of curvature R2 in a tip portion of cutting edge 13 may be equal to or less than a value obtained by multiplying a thickness of diamond layer 5 covering second face 42 by 0.1. Thereby, the cutting sharpness of the cutting tool can be improved while suppressing minute chipping of the cutting edge in the early stage of the process.

DETAILS OF EMBODIMENTS OF THE PRESENT INVENTION

The details of the embodiments of the present invention will be hereinafter described with reference to the accompanying drawings. In each of the figures, the same or corresponding components are designated by the same reference characters. Also, at least some of the embodiments described below may be arbitrarily combined.

First Embodiment

In the following, the configuration of the cutting tool according to the first embodiment will be described.

FIG. 1 is a top view of a cutting tool according to the first embodiment. The cutting tool according to the first embodiment includes a tip portion 1, a body portion 2, and a shank portion 3. The cutting tool according to the embodiment is a ball end mill. The cutting tool according to the first embodiment is not limited to a ball end mill. For example, the cutting tool according to the first embodiment may be a radius end mill and the like.

Figure 2:
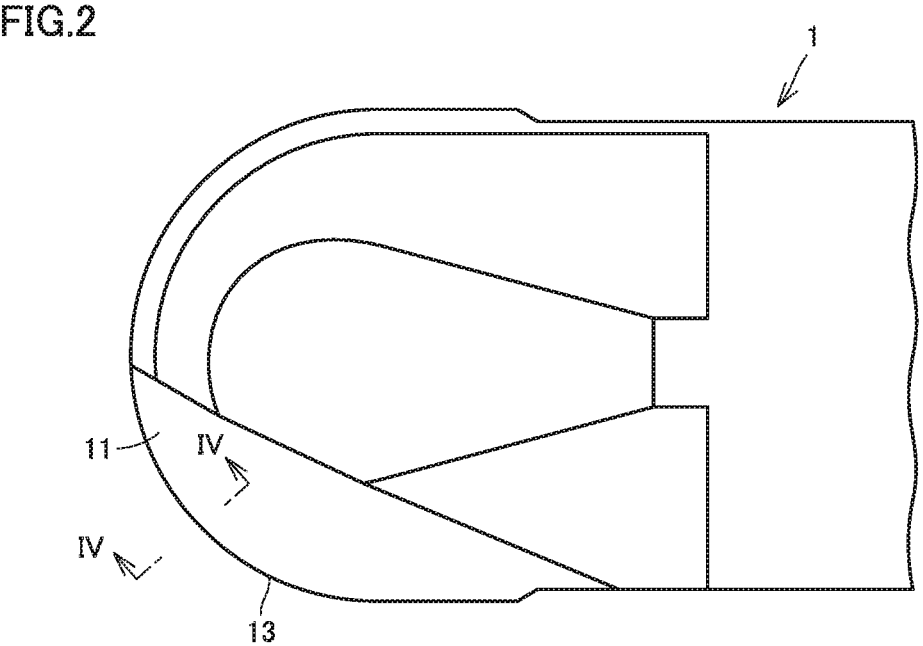
FIG. 2 is an enlarged top view of a region 11 of FIG. 1.

FIG. 2 is an enlarged top view of a region 11 in FIG. 1. As shown in FIG. 2, the cutting tool according to the first embodiment has tip portion 1 including a rake face 11 and a flank face 12 (see FIG. 4). Rake face 11 is continuous to flank face 12. The ridgeline between rake face 11 and flank face 12 forms a cutting edge 13. Flank face 12 is disposed at a positive angle with respect to rake face 11. In other words, flank face 12 is inclined toward rake face 11 with respect to the face extending along the ridgeline and perpendicular to rake face 11.

Figure 3:
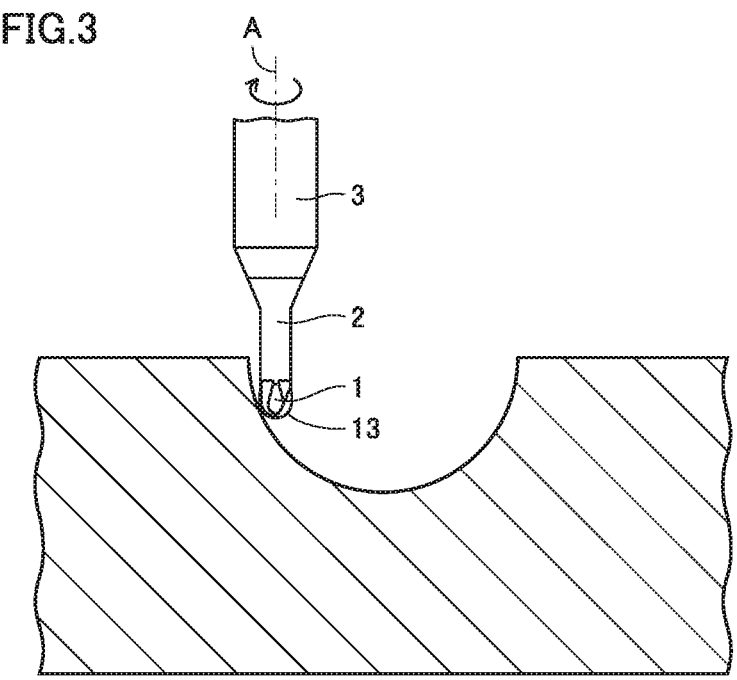
FIG. 3 is a schematic diagram of a cutting process using the cutting tool according to the first embodiment.

FIG. 3 is a schematic diagram of a cutting process using the cutting tool according to the first embodiment. As shown in FIG. 3, cutting edge 13 is pressed against a workpiece while the cutting tool according to the first embodiment is rotated about a central axis A. Thereby, the workpiece cutting process is performed.

Figure 4:
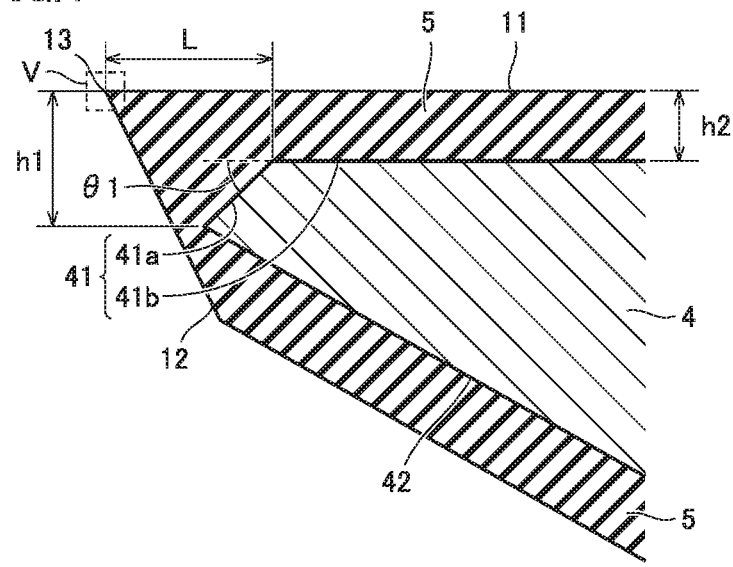
FIG. 4 is a cross-sectional view taken along IV-IV in FIG. 2.

FIG. 4 is a cross-sectional view taken along IV-IV in FIG. 2. As shown in FIG. 4, the cutting tool according to the first embodiment includes a base material 4 and a diamond layer 5. Base material 4 is made, for example, of cemented carbide as a sintered material containing powder such as tungsten carbide (WC) and a binder such as cobalt (Co). Base material 4 may be, for example, cermet, ceramics (SiC, $Si_3N_4$) or the like. The materials used for base material 4 are not limited to the above.

Diamond layer 5 contains a diamond crystal, for example. Diamond layer 5 is a diamond polycrystalline film, for example. Diamond layer 5 may contain a non-diamond component (for example, an amorphous component) and the like. Diamond layer 5 does not have to contain a diamond crystal. For example, diamond layer 5 may be a diamond like carbon (DLC) layer.

As shown in FIG. 4, base material 4 includes first face 41 and second face 42. First face 41 is provided as a face of base material 4 on the rake face 11 side. In other words, first face 41 faces rake face 11. Second face 42 is provided as a face of base material 4 on the flank face 12 side. In other words, second face 42 faces flank face 12. Diamond layer 5 covers first face 41 and second face 42.

First face 41 has first top face 41a and second top face 41b. First top face 41a is continuous to second face 42. Second top face 41b is continuous to first top face 41a and disposed such that first top face 41a is sandwiched between this second top face 41b and second face 42. In other words, first top face 41a is located between second face 42 and second top face 41b to connect second face 42 and second top face 41b. Diamond layer 5 is in contact with second face 42, first top face 41a and second top face 41b. First top face 41a is inclined with respect to second top face 41b.

In the cross section perpendicular to the cutting edge (FIG. 4), angle θ1 formed between first top face 41a and second top face 41b is a negative angle. In this case, the state where angle θ1 is a negative angle means that first top face 41a rotates counter-clockwise about the boundary line between first top face 41a and second top face 41b with respect to second top face 41b when the cutting tool is disposed in the state where second top face 41b faces upward and cutting edge 13 faces leftward. In a different point of view, the state where angle θ1 is a negative angle means that first top face 41a is inclined downward to the left with respect to second top face 41b when the cutting tool is disposed in the state where second top face 41b faces upward and cutting edge 13 faces leftward.

As shown in FIG. 4, angle θ1 formed between first top face 41a and second top face 41b may be −20° or more and less than 0°, for example. Angle θ1 formed between first top face 41a and second top face 41b corresponds to the inclined angle of first top face 41a with respect to the face in parallel with second top face 41b. The upper limit of angle θ1 may be −0.1° or may be −3°. The lower limit of angle θ1 may be −20° or may be −10°.

As shown in FIG. 4, diamond layer 5 covering second top face 41b has a thickness h2. Thickness h2 shows a distance between second top face 41b and rake face 11 in the direction perpendicular to second top face 41b. Diamond layer 5 covering first top face 41a has a thickness h1. Thickness h1 shows a distance between rake race 11 and the ridgeline between first top face 41a and second race 42 in the direction perpendicular to second top face 41b. Thickness h1 is greater than thickness h2. Thereby, the durability of cutting edge 13 can be improved.

As shown in FIG. 4, the distance between cutting edge 13 and the ridgeline between first top face 41a and second top face 41b is a distance L. Distance L corresponds to the distance in the direction in parallel with rake face 11 in the cross section perpendicular to cutting edge 13. It is preferable that distance L is 0.001 μm or more and 5 μm or less.

Figure 5:
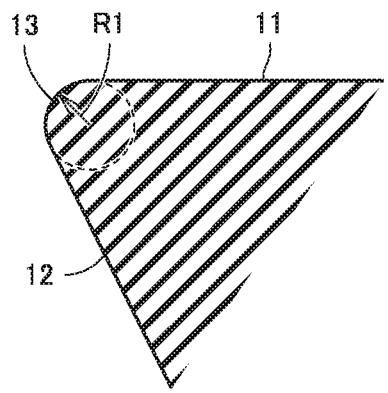
FIG. 5 is an enlarged view of a region V in FIG. 4.

FIG. 5 is an enlarged view of a region V in FIG. 4. As shown in FIG. 5, the tip portion of cutting edge 13 may be rounded. In a cross-sectional view, radius of curvature R1 in the tip portion of cutting edge 13 is 0.01 μm or more and 10 μm or less, for example. The upper limit of radius of curvature R1 may be 10 μm or may be 5 μm. The lower limit of radius of curvature R1 may be 0.01 μm or may be 0.1 μm.

Then, the method of manufacturing the cutting tool according to the first embodiment will be described.

Figure 6:
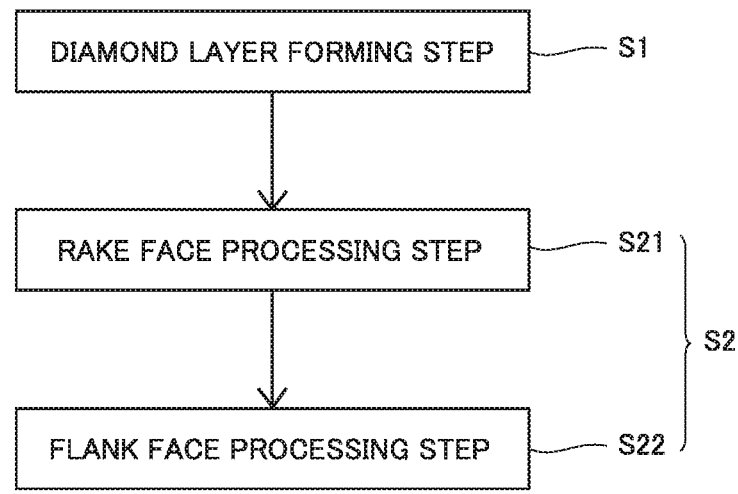
FIG. 6 is a process chart of a method of manufacturing the cutting tool according to the first embodiment.

FIG. 6 is a process chart of a method of manufacturing the cutting tool according to the first embodiment. As shown in FIG. 6, the method of manufacturing the cutting tool according to the first embodiment includes a diamond layer forming step S1 and a diamond layer removing step S2. The diamond layer removing step S2 may include a rake face processing step S21 and a flank face processing step S22.

Figure 7:
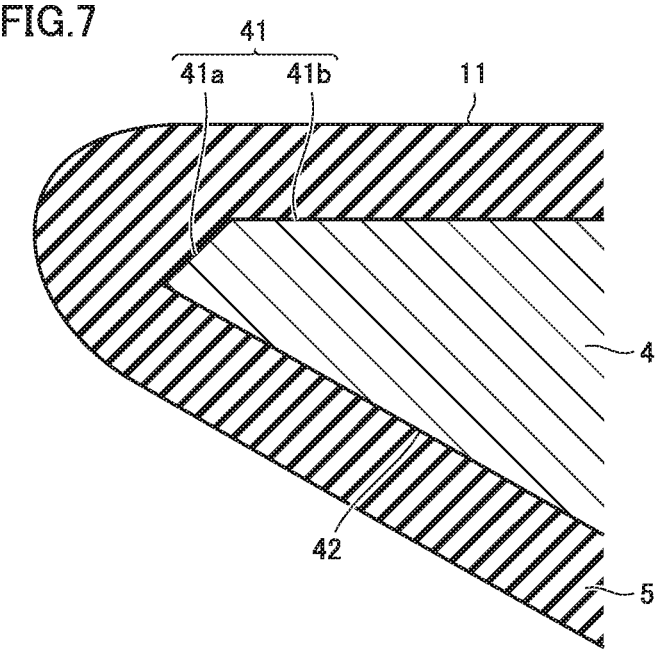
FIG. 7 is a cross-sectional view of the cutting tool according to the first embodiment in the stage after a diamond layer forming step S1 is ended and before a diamond layer removing step S2 is performed.

FIG. 7 is a cross-sectional view of the cutting tool according to the first embodiment in the stage after the diamond layer forming step S1 is ended and before the diamond layer removing step S2 is performed. As shown in FIG. 6, in the diamond layer forming step S1, diamond layer 5 is formed on base material 4. Specifically, first face 41 and second face 42 of base material 4 are covered by diamond layer 5. This formation of diamond layer 5 is performed by using hot filament chemical vapor deposition (HFCVD), for example.

Figure 8:
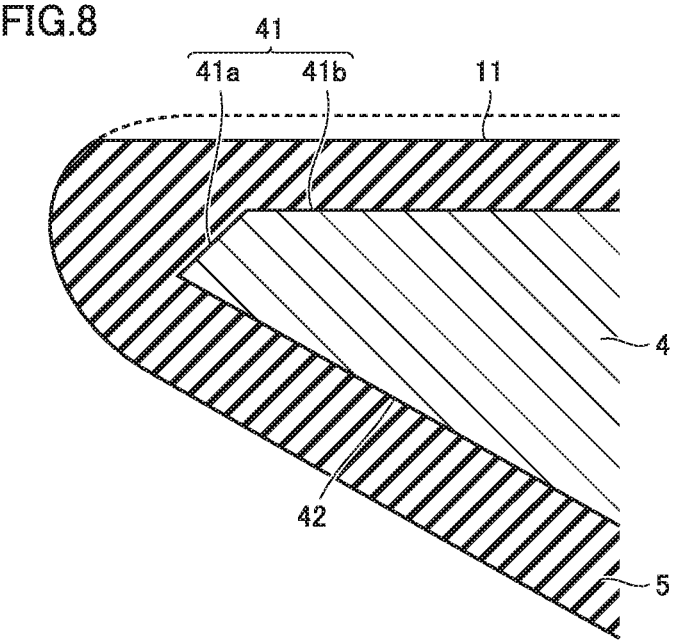
FIG. 8 is a cross-sectional view of the cutting tool according to the first embodiment in the stage after a rake face processing step S21 is ended and before a flank face processing step S22 is performed.

FIG. 8 is a cross-sectional view of the cutting tool according to the first embodiment in the stage after the rake face processing step S21 is ended and before the flank face processing step S22 is performed. As shown in FIG. 8, in the rake face processing step S21, diamond layer 5 covering first face 41 of base material 4 is partially removed. By partially removing diamond layer 5 that covers first face 41 of base material 4, the roundish shape of the tip portion of the cutting tool on the rake face 11 side is flattened. Diamond layer 5 is removed by applying a laser beam onto the rake face 11 side. The laser beam used for removing diamond layer 5 is a double harmonic of a YVO$_4$ laser beam or a yttrium aluminum garnet (YAG) laser beam, for example.

In the flank face processing step S22, diamond layer 5 covering second face 42 of base material 4 is partially removed. Diamond layer 5 covering second face 42 of base material 4 is partially removed such that base material 4 is not exposed from flank face 12. Thereby, the structure of the cutting tool according to the first embodiment shown in FIG. 4 is formed. Diamond layer 5 covering second face 42 of base material 4 is removed by applying a laser beam onto the flank face 12 side. The laser beam used for removing diamond layer 5 is a double harmonic of a YVO$_4$ laser beam or a YAG laser beam, for example. As diamond layer 5 covering second face 42 of base material 4 is partially removed, the roundish shape of the tip portion of the cutting tool according to the first embodiment on the flank face side is flattened, so that cutting edge 13 is sharpened.

Then, the functions and effects of the cutting tool according to the first embodiment will be described.

According to the cutting tool in the first embodiment, the principal cutting force applied in the flank face direction during cutting can be supported from below by first top face 41a. Thus, peeling-off the diamond layer from the flank face side can be suppressed. As a result, the durability of cutting edge 13 can be improved. Furthermore, the contact area between base material 4 and diamond layer 5 is increased when first top face 41a is included as compared with the case where first top face 41a is not included. Accordingly, for the cutting tool according to the first embodiment, the adhesiveness of diamond layer 5 to base material 4 can be improved.

Furthermore, according to the cutting tool in the first embodiment, angle θ1 formed between first top face 41a and second top face 41b is −20° or more and less than 0°. Thereby, the durability of the cutting edge can be further improved.

Furthermore, according to the cutting tool in the first embodiment, radius of curvature R1 in the tip portion of cutting edge 13 is 0.01 μm or more and 10 μm or less. Thereby, the cutting sharpness of the cutting tool can be improved while maintaining the high durability of the cutting edge.

Second Embodiment

In the following, the configuration of the cutting tool according to the second embodiment will be described. In the following description, differences from the cutting tool according to the first embodiment will be mainly described, but similar descriptions will not be repeated.

Figure 9:
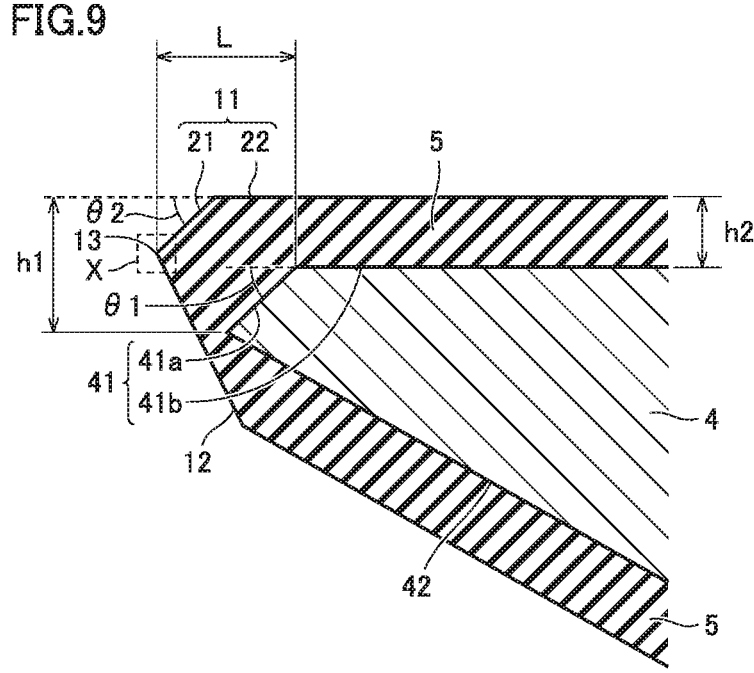
FIG. 9 is a cross-sectional view of a cutting tool according to the second embodiment in a cross section perpendicular to a cutting edge 13.

FIG. 9 is a cross-sectional view of a cutting tool according to the second embodiment in a cross section perpendicular to cutting edge 13. As shown in FIG. 9, the cutting tool according to the second embodiment includes a rake face 11, a flank face 12 and a cutting edge 13. The cutting tool according to the second embodiment includes a base material 4 and a diamond layer 5.

Rake face 11 has a first rake face portion 21 and a second rake face portion 22. First rake face portion 21 is continuous to flank face 12. Second rake face portion 22 is continuous to first rake face portion 21 and disposed such that first rake face portion 21 is sandwiched between this second rake face portion 22 and flank face 12. In other words, first rake face portion 21 is located between flank face 12 and second rake face portion 22 to connect flank face 12 and second rake face portion 22. First rake face portion 21 is inclined with respect to second rake face portion 22.

In the cross section perpendicular to cutting edge 13, an angle θ2 formed between first rake face portion 21 and second rake face portion 22 (see FIG. 9) is a negative angle. In this case, the state where angle θ2 is a negative angle means that first rake face portion 21 rotates counter-clockwise about the boundary line between first rake face portion 21 and second rake face portion 22 with respect to second rake face portion 22 when the cutting tool is disposed in the state where second rake face portion 22 faces upward and cutting edge 13 faces leftward. In a different point of view, the state where angle θ2 is a negative angle means that first rake face portion 21 is inclined downward to the left with respect to second rake face portion 22 when the cutting tool is disposed in the state where second rake face portion 22 faces upward and cutting edge 13 faces leftward.

In a cross-sectional view, angle θ2 formed between first rake face portion 21 and second rake face portion 22 is 20° or more and less than 0°, for example. Angle θ2 formed between first rake face portion 21 and second rake face portion 22 corresponds to the inclined angle of first rake face portion 21 with respect to the face in parallel with second rake face portion 22. The upper limit of angle θ2 may be 0.1° or may be 3°. The lower limit of angle θ1 may be 20° or may be 10°.

FIG. 10 is an enlarged view of a region X in FIG. 9. As shown in FIG. 10, the tip portion of cutting edge 13 may be rounded. In a cross-sectional view, a radius of curvature R2 in the tip portion of cutting edge 13 is equal to or less than the value obtained by multiplying the thickness of diamond layer 5 covering second face 42 by 0.1, for example. The thickness of diamond layer 5 covering second face 42 corresponds to the thickness of diamond layer 5 in the direction perpendicular to second face 42. Radius of curvature R2 may be equal to or less than the value obtained by multiplying the thickness of diamond layer 5 covering second face 42 by 0.001 or 0.01.

Then, the method of manufacturing the cutting tool according to the second embodiment will be hereinafter described. In the method of manufacturing the cutting tool according to the second embodiment, for example, the cutting tool according to the first embodiment (see FIG. 4) is first manufactured, and thereafter, diamond layer 5 in the vicinity of cutting edge 13 is removed. Diamond layer 5 is removed by applying a laser beam onto diamond layer 5 facing first top face 41a. Thereby, first rake face portion 21 is formed. The laser beam used for removing diamond layer 5 is a double harmonic of a YVO$_4$ laser beam, for example.

Then, the functions and effects of the cutting tool according to the second embodiment will be described.

In the cutting tool according to the second embodiment, rake face 11 includes: a first rake face portion 21 continuous to flank face 12; and a second rake face portion 22 continuous to first rake face portion 21 and disposed such that first rake face portion 21 is sandwiched between this second rake face portion 22 and flank face 12. In the cross section perpendicular to cutting edge 13, angle θ2 formed between first rake face portion 21 and second rake face portion 22 is a negative angle. Thereby, minute chipping or the cutting edge in the early stage of the process can be suppressed.

Furthermore, in the cutting tool according to the second embodiment, angle θ2 formed between first rake face portion 21 and second rake face portion 22 is −20° or more and less than 0°. Thereby, the cutting sharpness of the cutting tool can be improved while suppressing minute chipping of the cutting edge in the early stage of the process.

Furthermore, in the cutting tool according to the second embodiment, radius of curvature R2 in the tip portion of cutting edge 13 is equal to or less than the value obtained by multiplying the thickness of diamond layer 5 covering second face 42 by 0.1. Thereby, the cutting sharpness of the cutting tool can be improved while suppressing minute chipping of the cutting edge in the early stage of the process.

It should be understood that the embodiments disclosed herein are illustrative and non-restrictive in every respect. The scope of the present invention is defined by the terms of the claims, rather than the description of the embodiments provided above, and is intended to include any modifications within the meaning and scope equivalent to the terms of the claims.

REFERENCE SIGNS LIST 1 tip portion, 2 body portion, 3 shank portion, 4 base material, 5 diamond layer, 11 rake face, 12 flank face, 13 cutting edge, 21 first rake face portion, 22 second rake face portion, 41 first face, 41a first top face, 41b second top face, 42 second face, A central axis, L distance, R1, R2 radius of curvature, h1, h2 thickness.

The invention claimed is:

1. A cutting tool having a rake face, a flank face continuous to the rake face, and a cutting edge formed by a ridgeline between the rake face and the flank face, the cutting tool comprising:
   a base material having a first face on a side of the rake face and a second face on a side of the flank face; and
   a diamond layer covering the first face and the second face,
   the first face including
       a first top face continuous to the second face, and
       a second top face continuous to the first top face and disposed such that the first top face is sandwiched between the second top face and the second face, wherein
   an angle formed between the first top face and the second top face is a negative angle in a cross section perpendicular to the cutting edge,
   the rake face has a first rake face portion and a second rake face portion,
   the first rake face portion is located between the flank face and the second rake face portion,
   in the cross section perpendicular to the cutting edge, an angle formed between the first rake face portion and the second rake face portion is a negative angle,
   the flank face has a first flank face portion and a second flank face portion continuous to the first flank face portion,
   the first flank face portion is continuous to the first rake face portion,
   the second flank face portion is inclined with respect to the first flank face portion,
   a plane passes through a boundary between the first top face and the second face,
   the plane is parallel to the second top face,
   the plane intersects the first flank face portion, and
   in a direction perpendicular to the second top face, a thickness of the diamond layer at a boundary between the first top face and the second face is larger than a thickness of the diamond layer at a boundary between the first top face and the second top face.

2. The cutting tool according to claim 1, wherein the angle formed between the first top face and the second top face is −20° or more and less than 0°.

3. The cutting tool according to claim 1, wherein a radius of curvature in a tip portion of the cutting edge is 0.01 μm or more and 10 μm or less.

4. The cutting tool according to claim 1, wherein the angle formed between the first rake face portion and the second rake face portion is −20° or more and less than 0°.

5. The cutting tool according to claim 1, wherein a radius of curvature in a tip portion of the cutting edge is equal to or less than a value obtained by multiplying a thickness of the diamond layer covering the second face by 0.1.

\* \* \* \* \*